B. F. Adams.
Fly Net for Horses.
Nº 86,342.      Patented Feb. 2, 1869.
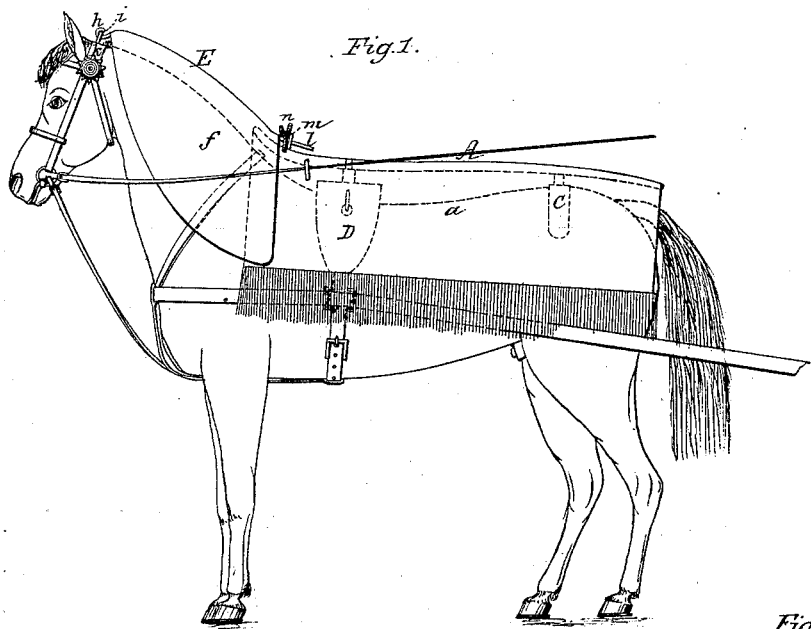
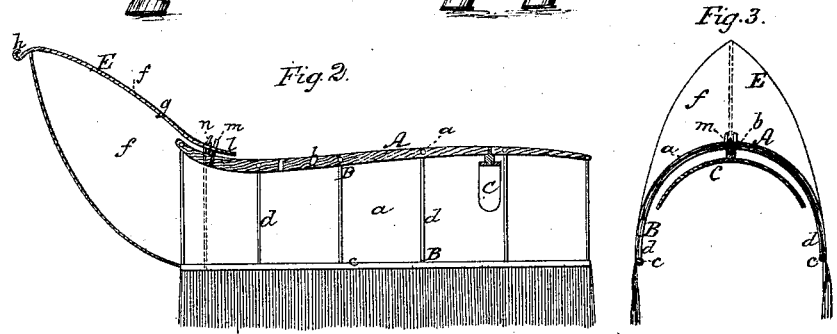
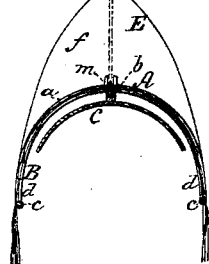
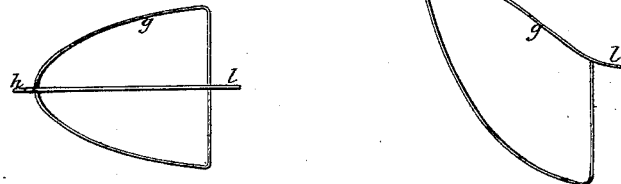
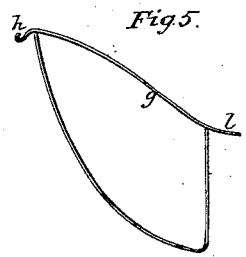
Witnesses
S. N. Piper.
J. P. Hale Jr.
Inventor.
B. F. Adams.
by his attorney
R. H. Eddy.

BENJAMIN F. ADAMS, OF FOREST HILL, BANGOR, MAINE.

Letters Patent No. 86,342, dated February 2, 1869.

IMPROVEMENT IN FLY-SCREENS FOR ANIMALS.

The Schedule referred to in these Letters Patent and making part of the same.

*To all persons to whom these presents may come:*

Be it known that I, BENJAMIN F. ADAMS, of Forest Hill, Bangor, in the county of Penobscot, and State of Maine, have invented a new and useful Improvement in Fly-Screens for Draught-Animals; and I do hereby declare the same to be fully described in the following specification, and represented in the accompanying drawings, of which—

Figure 1 is a side view of a horse having my improved back and neck-screens applied to him and his harness.

Figure 2 is a longitudinal section of the back and neck-screens.

Figure 3 is a transverse section of the back-screen taken through its rump-saddle.

A common fly-screen, or cloth, when applied to a horse, rests directly in contact with his body, and, as a consequence, not only heats the animal, and renders him uncomfortable in warm weather, but becomes, in some respects, a poor protection against insects, which, when the screen may be in contact with the body of the animal, are often able to bite or sting through the meshes of the screen and into the animal.

The object I have had in view, in the construction of my improved screen, has been to so apply it that its cloth shall be raised off the body of the horse, so that air may circulate freely between the screen and the said body, and insects be incapable of biting or stinging through the cloth and into the body.

To this end, I construct the body or back portion, A, of the screen, of a cloth covering, *a*, and a light frame, B, composed of three or other suitable number of long bars, *b c c*, and a series of arched bars or wires, *d d d*, connecting the bars *b c c*, the whole being arranged as represented.

Where the screen is to go over the rump of the horse, I combine with such screen what I term a rump-saddle, C, the form of which is shown in fig. 3, it being to rest on the rump, and keep the screen elevated a short distance therefrom.

The middle bar of the frame, I support on and attach to the saddle, D, of the harness.

Strings, or any other proper device or devices, may be applied to the screen and harness, to prevent lateral sway of the screen while the animal may be in movement.

The head or neck-portion, E, of the screen is composed of cloth, *f*, and a light wire frame, *g*, upon which the cloth is stretched.

A top view of the said frame is shown in Figure 4, and a side view of it in Figure 5.

At its peak or front end it has a hook, *h*, extended from it, to catch into an eye, *i*, extended up from the headstall *k* of the harness.

A tongue, *l*, projects rearward from the frame *g*, at its middle, and is to rest in a forked projection, *m*, extended up from the saddle of the harness.

Straps or strings, *n n*, extending up from the back-screen, are lapped across and tied over the tongue *l*.

The tongue and the fork, while serving, with the strings, to hold the neck-screen in connection with the back-screen, readily admit the horse to throw his head either up or down, or to move it or his neck laterally.

When the back-screen is to be applied to a horse, arranged between the thills of a vehicle, it may have sockets to receive the ends of the thills, and at the rear part of the screen there may be, also, any suitable device or devices for connecting the screen to the thills.

1. I claim the combination and arrangement of the two separate back and neck-frames, and the separate coverings, the whole being as set forth.

2. I also claim the arrangement and combination of the tongue *l*, and the forked supporter *m* thereof, with the neck and back-screens.

BENJ'N F. ADAMS.

Witnesses:
ALEXR. WARFIELD,
CHAS. P. WIGGIN.